United States Patent [19]

Skubon

[11] 3,941,743

[45] Mar. 2, 1976

[54] CAST METAL APPEARING METAL FILLED RESIN COMPOSITIONS

[75] Inventor: Michael J. Skubon, Strongsville, Ohio

[73] Assignee: Ashland Oil, Inc., Ashland, Ky.

[22] Filed: Apr. 27, 1973

[21] Appl. No.: 355,124

[52] U.S. Cl. .............................. 260/38; 260/37 M
[51] Int. Cl.² ........................................ C08K 3/08
[58] Field of Search ........................ 260/37 M, 38

[56] References Cited
UNITED STATES PATENTS

| | | | |
|---|---|---|---|
| 2,078,808 | 4/1937 | Reardon et al. | 260/37 M X |
| 2,374,136 | 4/1945 | Rothrock | 260/59 X |
| 2,485,176 | 10/1949 | Waterfall | 260/38 X |
| 2,488,332 | 11/1949 | Roush | 260/38 |
| 2,748,099 | 5/1956 | Burner et al. | 260/37 M |
| 3,030,237 | 4/1962 | Price | 260/38 X |
| 3,097,080 | 7/1963 | Weir | 264/162 |
| 3,174,977 | 3/1965 | Hoiberg et al. | 264/162 |
| 3,432,457 | 3/1969 | Robins | 260/38 |
| 3,471,435 | 10/1969 | Miller | 260/38 X |
| 3,676,392 | 7/1972 | Robins | 260/38 |

*Primary Examiner*—Donald E. Czaja
*Assistant Examiner*—S. M. Person

[57] ABSTRACT

The present invention relates to metal filled resin compositions having a cast metal appearance, curable at room temperature comprised of certain phenol-formaldehyde resins, a polyisocyanate hardener therefor, a catalytic concentration of a base, and a metallic powder of proper size and configuration.

2 Claims, No Drawings

CAST METAL APPEARING METAL FILLED RESIN COMPOSITIONS

The present invention relates in brief to metal filled resin compositions having a metallic appearance. More particularly the present invention relates to metal filled resin compositions having a cast metal appearance which are curable at room temperature and are comprised of a phenol-formaldehyde resin, a polyisocyanate hardener therefor, a catalytic concentration of a base, and at least about 2% of a metallic powder such as aluminum, bronze, copper, etc. The metal filled resin compositions of this invention are suitable substitutes for cast metal articles where a metallic appearance is paramount to great physical strength.

BACKGROUND OF THE DISCOVERY

In order to prepare materials with a cast metal appearance, it has generally been required to prepare them as cast metals per se. To do so, however, it has involved the use of equipment needed for working with molten metals or equipment necessary for die or investment casting or necessary to prepare sintered metal powder castings. While all of these various methods and techniques have been suitable with varying degrees of acceptability for certain applications they have all suffered some disadvantage. One major disadvantage to all of the foregoing is that the cost of the equipment and procedures involved generally makes it economically unfeasible to produce a limited and relatively small number of casting by such methods. Each of these methods has suffered one or more additional of the following non-exhaustive list of disadvantages; difficulty of obtaining good replication of pattern detail, the relatively high degree of skill involved in working with the techniques and the safety factor to personnel involved in working with molten or very hot metals or equipment.

I have now found that compositions having a cast metal appearance, which give good replication of pattern detail and that can be prepared at room temperature are obtainable by filling a polyisocyanate and certain phenol-formaldehyde resin compositions with metal particulate matter of proper configuration and curing said resin with a base catalyst having a $pK_b$ value in the range of about 7–11.

The art of filling resinous compositions to achieve various objectives is legion. However so far as I am aware none have prepared compositions as herein described and particularly having the overall properties of the present compositions.

SUMMARY STATEMENT OF THE INVENTION

The present invention comprises compositions of organic solvent, phenolic resins containing benzylic ether structure and/or methylol end groups in non-aqueous systems which have been combined with sufficient polyisocyanate to cross-link the phenolic resin, containing as the curing catalyst a base having a $pK_b$ value in the range of about 7 to about 11 and filled with a metallic powder composition.

Before proceeding with a discussion of the metallic fillers that can be employed the resin, the curing catalyst, curing characteristics and other parameters of the foregoing will be discussed.

It is first desired to point out that the resins, the curing catalyst, the curing characteristics are described in great detail in U.S. Pat. No. 3,676,392 to Janis Robins on July 11, 1972 and entitled "Resin Composition". The applicable teachings of that patent are incorporated herein by reference although for convenience of the reader a major part of the teachings of that patent which are applicable here will be set forth herein. However, it is to be clearly understood that the other teachings which those skilled in the art recognize would be applicable are incorporated. With the exception of the cure times being altered slightly by the filler as will be discussed hereinbelow, the chemistry of the resin, the cure catalyst, the physical properties and parameters related to the foregoing are the same.

The phenol-formaldehyde and polyisocyanate resinous composition to be filled according to this invention will be described in more detail hereinafter; however, in order to facilitate the understanding of certain parameters and other aspects of the resin composition and eventually the metal filler some general desired characteristics of the resin composition will be described.

It is important in any plastic molding or plastic casting operation that there be adequate work-time with the catalyzed resin in order to insure complete filling of the mold or pattern and thereby achieve good replication of pattern detail. At the same time once that condition has been achieved, a minimum of time is desired before the cast article can be stripped from the pattern. The presently employed resinous composition is ideal in both of the foregoing respects. The work-time can be varied by the catalyst selected and amount thereof. At the same time it is also possible to vary the cure speed by the amount of polyisocyanate so that once cure begins it is virtually instantaneous and the article can be immediately stripped from the mold. Such cure speeds constitute preferred embodiments of the invention. With this general discussion as a background in regard to the resinous composition the details of the resin components and catalyst will now be discussed.

The resin compositions of the present invention are generally made available as a two-package system comprising the phenolic resin component in one package and the polyisocyanate hardner component in the other package, both components being in liquid form and therefore generally comprising organic solvent solutions. In general the catalyst is incorporated into the resin component although such is not essential. At the time of use, the contents of the two packages are combined and are thoroughly mixed. The filler can be added to one of the two packages before mixing together or the filler can be separately added at the time the catalyst is added or after the catalyst has been added provided sufficient allowance is made in the work-time for doing so.

The benzylic ether resins which comprise one species of the phenolic resins employed in the present invention are characterized by containing a unit having the formula:

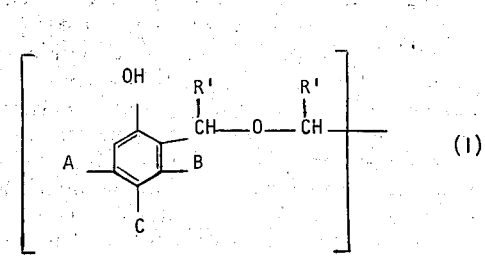

wherein A, B, and C are hydrogen, hydrocarbon radicals, oxyhydrocarbon radicals or halogen, the R's are individually H or hydrocarbon radical of one to eight carbon atoms and which have average degrees of polymerization, as measured by the number of repeating aromatic rings, of generally 3 to 100 and preferably 4 to 10. Although higher molecular weight resins are operable in the curing reactions above described such resins are difficult to handle from the standpoint of viscosity in requiring excessive amounts of solvents to bring the viscosity of the resin component to a level normally desired in coating and binder applications.

The described benzylic ether resins are condensation polymers of a phenol having the general formula:

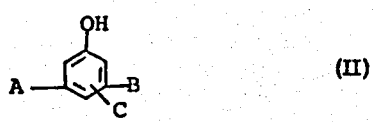

(II)

wherein A, B and C are hydrogen, hydrocarbon radicals, oxyhydrocarbon radicals, or halogen, with an aldehyde having the general formula R'CHO wherein R' is a hydrogen or a hydrocarbon radical of one to eight carbon atoms, prepared in the liquid phase in the substantial absence of water at temperatures below about 130°C in the presence of catalytic concentrations of a metal ion dissolved in the reaction medium. The molar ratio of aldehyde to phenol can generally be varied from 3:1 to 1:1, although some resin is also formed outside these ratios. The preparation and characterization of these resins is disclosed in greater detail in copending application Ser. No. 536,180, filed Mar. 14, 1966 now U.S. Pat. No. 3,485,797 issued Dec. 23, 1969. In the preferred form, these resins have the general formula:

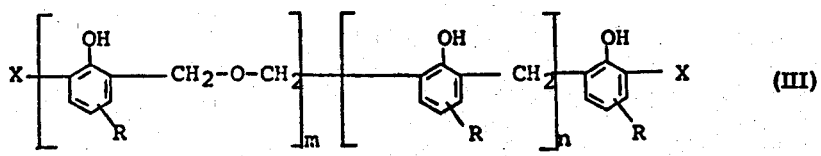

(III)

wherein R is a hydrogen or a phenolic substituent meta to the phenolic hydroxyl group, the sum of m and n is at least 2, X is an end group from the group consisting of hydrogen and methylol, and wherein m is at least 1 and the sum of m and the number of methylol end groups is at least 2.

The most preferred benzylic ether resins employed in the resin compositions of the present invention are those in which R is hydrogen.

The phenols employed in the formation of the benzylic ether resins are generally all phenols which have heretofore been employed in the formation of phenolic resins generally and which are not substituted at either of the carbon atoms ortho to the hydroxyl group. Any one, all, or none of the remaining carbon atoms of the phenol ring can be substituted. The nature of the substituent can vary widely and it is only necessary that the substituent not interfere in the polymerization of the aldehyde with the phenol at the ortho-position. Substituted phenols employed in the formation of the phenolic resins include alkyl substituted phenols, aryl-substituted phenols, cycloalkyl-substituted phenols, alkenyl-substituted phenols, alkoxy-substituted phenols, aryloxy-substituted phenols, and halogen-substituted phenols, the foregoing substituents containing from one to 26 and preferably from one to six carbon atoms. Specific examples of suitable phenols, aside from the preferred unsubstituted phenol, include: m-cresol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,6-trimethoxy phenol, p-ethoxy phenol, p-butoxy phenol, 3-methyl-4-methoxy phenol, and p-phenoxy phenol.

The aldehyde reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of one to eight carbon atoms. The most preferred aldehyde is formaldehyde.

The methylol-terminated phenolic resins useful in the present invention are resole resins which are organic solvent soluble. The organic solvent soluble resole resins are a well established class of resins the preparation of which is known. However, since the resole resins having a high proportion of ortho-ortho methylene linkages are generally the organic solvent soluble resole resins, the majority of the resole resins useful in this invention are prepared from alkyl-substituted phenols wherein the para position is substituted. On the other hand, organic solvent soluble resole resins may also be prepared from phenols unsubstituted in the ortho and para positions by first preparing an ortho-ortho novolac and then reacting the novolac with further formaldehyde under milder conditions to produce a methylol-terminated resin which is an organic solvent soluble resole resin unsubstituted at the para positions. As an illustration of this procedure, a mixture of phenol and formaldehyde wherein the molar ratio of phenol to formaldehyde is greater than 1:1 may be condensed in the presence of an ortho-ortho directing catalyst, such as sodium hydroxide, under alkaline pH, e.g. between 5 and 6, and at a temperature in the neighborhood of 160° C. When essentially no free formaldehyde remains, the excess phenol is removed by vacuum distillation and the resin cooled to the neighborhood of 40° C to 50° C. Additional formaldehyde is then added and the subsequent exothermic reaction controlled to keep the temperature below about 95° C. This mixture is then rapidly cooled before the resin becomes insoluble, which results in a methol-terminated organic solvent soluble resole resin having essentially no para substitution and being useful in this invention. The disclosures of British Pat. Nos. 773,510 and 773,547 are particularly pertinent to the above resole resins prepared from phenol unsubstituted in the meta and para positions.

The phenolic resin component is generally employed as a solution in an organic solvent although it is also feasible to employ the low molecular weight liquid resins without dilution. The desirability and effect of solvents will subsequently be described in greater detail. The optimum solvent concentrations for the phenolic resins will vary depending on the type of resins employed and its molecular weight. In general, the solvent concentration will be in the range of up to 80% by weight of the resin solution and preferably in the range of 20 to 80 percent. It is preferred to keep the viscosity of the resin component at less than X-1 on the Gardener-Holt Scale.

The catalyst employed in the compositions of the present invention is a base having a $pK_b$ value in the range of about 7 to about 11. The $pK_b$ value is the negative logarithm of the dissociation constant of the base and is a well known measure of the basicity of a basic material. The higher this number is, the weaker the base. The bases falling within this range are generally organic compounds containing one or more nitrogen atoms. Preferred materials are heterocyclic compounds containing at least one nitrogen atom in the ring structure. Specific examples of bases which have $pK_b$ values within the necessary range include 4-alkyl pyridines wherein the alkyl group has from one to four carbon atoms, isoquinoline, aryl-pyridines such as phenyl pyridine, pyridine, acridine, 2-methoxypyridine, pyridazine, 3-chloro pyridine, quinoline, N-methyl imidazole, 4,4-dipyridine, phenyl-propyl pyridine, 1-methylbenzimidazole, and 1,4-thiazine.

In view of the varying catalytic activity and varying catalytic effect desired, catalyst concentrations will vary widely. In general the lower the $pK_b$ value is, the shorter will be the work-time of the composition and the faster, more complete will be the cure. Solvents and any acidity present in added ingredients such as sand may affect the catalytic activity. In general, however, catalyst concentrations will range from 0.01 to 10 percent by weight of the phenolic resin. Preferably catalyst concentrations in the range of about 0.25% to 2% and most preferably about 0.6% to 2% are employed. In testing to determine cure times it is to be understood that I have found that cure times are slowed about 10% by the addition of the metallic filler.

The determination of $pK_b$ values of organic compounds may be made in various conventional manners depending upon the nature of the particular organic compound. The $pK_b$ values of compounds useful as catalysts in this invention may be determined according to methods described in D. D. Perrin in Dissociation Constants of Organic Bases in Aqueous Solution (Butterworths, London, 1965).

The second component or package of the novel binder composition comprises an aliphatic, cycloaliphatic, or aromatic polyisocyanate having preferably from two to five isocyanate groups. If desired, mixtures of polyisocyanates can be employed. Less preferably, isocyanate prepolymers formed by reacting excess polyisocyanate with a polyhydric alcohol, e.g. a prepolymer of toluene diisocyanate and ethylene glycol, can be employed. Suitable polyisocyanates include the aliphatic polyisocyanates such hexamethylene diisocyanate, alicyclic polyisocyanates such as 4,4'dicyclohexylmethane diisocyanate, and aromatic polyisocyanates such as 3,4- and 2,6-toluene diisocyanate, diphenylmethyl diisocyanate, and the dimethyl derivatives thereof. Further examples of suitable polyisocyanates are 1,5-naphthalene diisocyanate, triphenylmethane triisocyanate, xylylene diisocyanate, and the methyl derivatives thereof, polymethylenepolyphenol isocyanates, chlorophenylene-2,4-diisocyanate, and the like.

Although all polyisocyanates react with the described phenolic resin to form a cross-linked polymer structure, the preferred polyisocyanates are aromatic polyisocyanates and particularly diphenylmethane diisocyanate, triphenylmethane triisocyanate, complex commercially-available compositions containing polymeric isocyanates sold under such trademarks as "PAPI", "Mondur MR" and "NCO-120," and mixtures thereof.

The polyisocyanate is employed in sufficient concentrations to cause the curing of the phenolic resin and other active hydrogen-containing materials when present. This refers to materials with hydrogen atoms which display activity according to the well known Zerewitinoff method as described by Kohlen in JACS. 49, 3181 (1927). Thus, for example, phenol-formaldehyde resins of the Novolac and/or resole types having an average of two or more active hydrogen atoms per molecule may be employed. For information on Novolacs and resoles the disclosure of U.S. Pat. Nos. 3,242,107 and 1,409,571 and British Pat. No. 757,392 are hereby incorporated by reference to the extent pertinent. When present the total weight of such other active hydrogen containing material should not exceed three times the weight of the phenolic resin and should preferably be less than that of the phenolic resin. In general, the polyisocyanate will be employed in a range of 10 to 500 weight percent of the polyisocyanate based on the weight of the phenolic resin component. Preferably, from 20 to 300 weight percent of polyisocyanate on the same basis is employed. The polyisocyanate is employed in liquid form. Liquid polyisocyanates can be employed in undiluted form. Solid or viscous polyisocyanates are employed in the form of organic solvent solutions, the solvent being present in a range of up to 80 percent by weight of the solution.

Although the solvent employed in combination with either the phenolic resin or the polyisocyanate or for both components does not enter, to any significant degree into the reaction between the isocyanate and the phenolic resin, it can affect the reaction. Thus the difference in the polarity between the polyisocyanate and the benzylic ether resins restricts the choice of solvents in which both components are compatible. Such compatibility is necessary to achieve complete reaction and curing of the resin compositions of the present invention. Additionally, the solvent, by reducing the viscosity of the binder, aids in the uniform distribution of the resin composition on a substrate or a particulate solid. Polar solvents of either the protic or aprotic type are good solvents for the phenolic resin, but have limited compatibility with the polyisocyanates. Aromatic solvents, although compatible with the polyisocyanates, are less compatible with the phenolic resins. It is therefore preferred to employ combinations of solvents and particularly combinations of aromatic and polar solvents. Suitable aromatic solvents are benzene, toluene, xylene, ethylbenzene, naphthalene, and mixtures thereof. Preferred aromatic solvents are mixed solvents that have an aromatic content of at least 90 percent and a boiling point range of 280° to 450° F. The polar solvents should not be extremely polar such as to become incompatible with the aromatic solvent. Suitable slightly polar solvents which are compatible with aromatic solvents include, in particular, ester and ether solvents. Suitable more polar but less costly solvents are generally those which have been classified in the art as coupling solvents and include furfural, furfuryl alcohol, cellosolve acetate, butyl cellosolve, butyl carbitol, diacetone alcohol, and "Texanol".

On combining the two components of the resin composition of the present invention, the resulting mixture is capable of cross-linking at room temperature although, of course, elevated temperatures can be used to accelerate cure if desired.

While the ratios of the two components of the two-package resin system discussed hereinabove provide the best physical properties and especially strength, certain application according to this invention do not require great strengths and accordingly the ratios may be varied with more latitude. The extent of acceptable variation in such cases can be readily determined by routine experimentation.

The metallic particles to be employed as the filler can be virtually any relatively inert metal or metallic composition under normal ambient conditions. Illustrative but non-limiting examples of suitable metals are aluminum, copper, nickel, brass, bronze, steel, lead, pewter and other metals or alloys or mixtures thereof. Metals not sufficiently inert are for example sodium and lithium.

The metals are to be in particulate form generally varying in size from about 400 mesh up to about 150 mesh (Tyler sieve). Preferably they vary in the range of about 325 mesh to about 200 mesh. One reason why metal of particle size below about 400 is normally not employed is because of viscosity considerations since smaller particles cause increased viscosity. Another reason is the higher cost of such finer particles. The reason why particles larger than about 150 mesh are usually not employed is because the individual metal particles and resin therebetween will be too readily visible to the eye and the product will not have a genuine cast metal appearance. Below about 325 mesh the cure time must be delayed in order to allow for sufficient settling of the metal particles to the bottom of the mold which will be the visible metallic appearing surface of the articles produced. Preferably the metals are allowed to settle sufficiently to maximize that amount which gravitates to the bottom surface or proximity thereof. The cure time of the resin composition is thus to be adjusted accordingly by means of the catalyst to allow for settling of the metal particles where desired. Of course where large amounts of metal are employed little or no settling time is required to obtain sufficient metal particles in the bottom of the mold since the metallic filler is to be thoroughly and relatively uniformly mixed before introducing same into the mold. The manner or equipment employed in mixing the components is not critical except that it must have sufficient speed to provide thorough mixing with a remainder of work-time left to allow for proper filling of the mold and if desired some settling of metallic powder.

The configuration of the metallic particles is very important. Flakes or platelet type configuration are not suitable. The metallic particles are preferably of a generally spherical shape. They, however, are not absolutely required to be. They may be of a granular form and of angular of sub-angular shape. The important thing is that they have a sufficiently compact configuration so as to enable settling without undue delay if settling is desired. In all cases the configuration must permit adequate compaction of the particles to prevent the presence of quantities of resin between same being readily visible to the eye and thereby not appear to be a cast metal.

As to the amount of metal filler that is to be employed, that can vary between about 2% and 80% by weight based on the composition (i.e. phenol-formaldehyde, polyisocyanate, catalyst and metal filler). The minimum amount required to achieve a metallic appearance depends primarily on the particular metal filler. For example when copper, brass or bronze are employed, the minimum can be as low as about 2% by weight. The maximum amount of these metals can generally be as high as about 80% by weight. Preferably an amount in the range of about 20% to 50% is employed. On the other hand when aluminum metal powder is employed a minimum of about 30% by weight is required and a maximum of about 60% by weight can be employed. Preferably about 35% to 45% of aluminum is employed.

The surface of the finished product can be polished to increase the lustre of the metallic surface or portions thereof. Polishing can be done by generally conventional techniques and equipment. Thus polishing by hand or any of the various powered buffer devices can be employed with or without chemical polishing aids. A particular lustre finish may be desired to be obtained by grinding the surface or portions thereof of the article. Care should be taken so that the chemical polishing aid or heat achieved by the buffering or grinding means does not have a deleterious affect on the resin. This can be readily checked by simple tests on a few test specimens. The metal filler will rust, tarnish or corrode so that if this is not desired an appropriate protective clear coating can be applied to the article. Lustre increases with decreasing particle size and accordingly this can influence the size of particle chosen in a particular application.

Varying degrees of lustre will be desired, even on the same metal filled casting, and maintaining the initial level of lustre will be desired in some cases. However, in other cases a coating which partially or completely (i.e., of a portion) obscures the metallic appearance will be desired. It is obvious that where the coating completely obscures the metallic surface that the application of such coatings will be normally limited to a portion of the surface. The composition may also be colored if desired with such materials as Hansa yellow, Thalo Blue, Red Iron Oxide, Fast Red, Raw Umber, Perma-Cal Yellow.

The peak exotherm achieved during the cure of the compositions of this invention is on the order of about 200°F and accordingly short strip times are preferred in order to reduce the adverse effect on the pattern where same is made of a plastic, rubber or similar material.

The invention is further illustrated by the following examples in which, unless otherwise indicated, all parts are by weight and all percentages are weight percentages.

EXAMPLE I

One part of phenol-formaldehyde substantially as described in Example I of U.S. 3,676,392 containing about 1.2% of 4-phenylpropyl pyridine was hand mixed with one part by weight of Mondur MR (dissolved in solvent as described in Example I of U.S. Pat. No. 3,676,392) and about 33⅓% of Alcan Aluminum (X-70 spherical) which was 325 mesh (98%) particle size. The metal filled resin and catalyst was hand mixed for about 30 seconds and then transferred to a mold having a circular cavity about 3½ inches in diameter and about ¼ inches deep. The mold provided for some raised lettering and design to be produced by the casting. After about 50 more seconds lapsed after mixing, cure started and the casting was stripped after about a lapse of about 10 seconds more. The casting was rigid, gave good replication of the mold and had the appearance of being a cast aluminum plaque. The raised design was buffed to a high lustre which enhanced its metallic appearance.

EXAMPLE II

When the above example was repeated using 200 mesh prealloyed bronze powder (i.e., about 89% copper and 10% tin) in the place of aluminum and using about 0.8% of catalyst a pot life of about 120 seconds was obtained (i.e, cure started in about 120 seconds) and the part was stripped from the mold after about 10 more seconds. It looked to the unaided eye like a solid bronze metal casting. Again good mold replication was obtained.

I claim:

1. A process for preparing a cast metal appearing article which comprises:
   A. providing a metal filled resin composition curable at room temperature and comprising a phenolic resin component, a hardener component, and a curing catalyst wherein said resin component is (a) an organic solvent soluble benzylic ether resin which contains benzylic ether group and which comprises a condensation polymer of a phenol having the general formula:

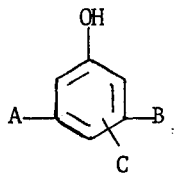

wherein A, B and C are hydrogen, hydrocarbon radicals, oxyhydrocarbon radicals or halogen, condensed with an aldehyde having the general formula R'CHO wherein R' is hydrogen or a hydrocarbon radical of one to eight carbon atoms in the presence of catalytic concentrations of a metal ion, or (b) a methylol-terminated phenolic resin which comprises a resole resin which is organic solvent soluble; said hardener component is liquid polyisocyanate containing at least two isocyanate groups; and is present in an amount equal to 10 to 500 weight percent based on the weight of the resin and said curing agent is a base having a $pK_b$ value in the range of about 7 to about 11 and is present in an amount equal to 0.01 to 10.0 weight percent based on the weight of the resin and between about 20% to about 50% by weight of the composition of a metallic powder selected from the group consisting of copper, nickel, brass, bronze, iron, steel, and mixtures thereof, or from about 35% to about 45% by weight of aluminum powder, said powder having a particle size in the range of about 200 to 325 mesh, and having a general spherical shape;

B. adding said metal filled resin composition to a mold;
   C. curing said metal filled resin composition in said mold;
   D. stripping the cured and molded article from the mold; and
   E. then polishing at least a portion of a surface of the cured article to increase the lustre of at least a portion of the article.

2. The process of claim 1 wherein said composition is cured at room temperature.

* * * * *